United States Patent
Hill et al.

(10) Patent No.: US 8,474,753 B2
(45) Date of Patent: Jul. 2, 2013

(54) AIRCRAFT OCCUPANT PROTECTION SYSTEM

(75) Inventors: Andrew T. Hill, Arlington, TX (US); Michael R. Smith, Colleyville, TX (US); Zi Lu, Coppell, TX (US); Cheng-Ho Tho, Irving, TX (US)

(73) Assignee: Textron Innovations Inc., Providence, RI (US)

( * ) Notice: Subject to any disclaimer, the term of this patent is extended or adjusted under 35 U.S.C. 154(b) by 142 days.

(21) Appl. No.: 13/125,884

(22) PCT Filed: Jul. 27, 2009

(86) PCT No.: PCT/US2009/051821
§ 371 (c)(1),
(2), (4) Date: Apr. 25, 2011

(87) PCT Pub. No.: WO2011/014153
PCT Pub. Date: Feb. 3, 2011

(65) Prior Publication Data
US 2011/0204181 A1    Aug. 25, 2011

Related U.S. Application Data

(63) Continuation-in-part of application No. 12/089,884, filed on Apr. 10, 2008, now Pat. No. 7,954,752, which is a continuation-in-part of application No. 12/679,563, filed on Mar. 23, 2010, which is a continuation-in-part of application No. PCT/US2007/082140, filed on Oct. 22, 2007.

(51) Int. Cl.
*B64C 25/56* (2006.01)

(52) U.S. Cl.
USPC ............. 244/100 A; 244/17.17; 244/107

(58) Field of Classification Search
USPC ............. 244/17.17, 100 A, 100 S, 107, 139, 244/121, 138 R
See application file for complete search history.

(56) References Cited

U.S. PATENT DOCUMENTS 2,131,528 A    9/1938   Soyer
3,602,661 A    8/1971   Liedberg
(Continued)

FOREIGN PATENT DOCUMENTS

DE    4118300 A1    12/1992
DE    4320470 A1    12/1994
(Continued)

OTHER PUBLICATIONS

First Office Action from application 2007801012216. Issued from the Chinese Patent Office dated Apr. 27, 2012, 5 pages.
(Continued)

*Primary Examiner* — Christopher P Ellis
*Assistant Examiner* — Medhat Badawi
(74) *Attorney, Agent, or Firm* — James E. Walton; J. Oliver Williams

(57) ABSTRACT

A crash attenuation system for an aircraft includes an airbag carried by the aircraft that is inflatable generally adjacent an exterior of the aircraft. The airbag is in fluid communication with at least one vent passage for channeling gas from within the interior of the airbag to a region external to the airbag that allows the gas to escape without being obstructed by the airbag. A gas source is in fluid communication with the interior of the airbag for inflating the airbag. A vent valve is provided within the vent passage for controlling a flow of gas through the vent passage, thereby controlling deflation of the airbag. The vent valve is continuously adjustable to and between an open state, a closed state, and any number of partially open states.

20 Claims, 17 Drawing Sheets

U.S. PATENT DOCUMENTS

| | | | |
|---|---|---|---|
| 3,603,535 A | 9/1971 | DePolo | |
| 3,727,716 A | 4/1973 | Jenkins | |
| 3,738,597 A | 6/1973 | Earl et al. | |
| 3,964,698 A | 6/1976 | Earl | |
| 3,981,462 A | 9/1976 | Berezhnoi et al. | |
| 3,990,658 A | 11/1976 | Letsinger | |
| 4,004,761 A | 1/1977 | McAvoy | |
| 4,032,088 A * | 6/1977 | McAvoy | 244/100 A |
| 4,657,516 A * | 4/1987 | Tassy | 441/125 |
| 5,259,574 A | 11/1993 | Carrot | |
| 5,356,097 A | 10/1994 | Chalupa | |
| 5,407,150 A * | 4/1995 | Sadleir | 244/12.4 |
| 5,560,568 A | 10/1996 | Schmittle | 244/48 |
| 5,765,778 A * | 6/1998 | Otsuka | 244/101 |
| 5,836,544 A * | 11/1998 | Gentile | 244/17.17 |
| 5,992,794 A * | 11/1999 | Rotman et al. | 244/17.17 |
| 6,070,546 A * | 6/2000 | Downey et al. | 114/123 |
| 6,158,691 A * | 12/2000 | Menne et al. | 244/100 A |
| 6,227,325 B1 | 5/2001 | Shah | |
| 6,273,463 B1 * | 8/2001 | Peterson et al. | 280/739 |
| 6,338,456 B1 * | 1/2002 | Cairo-Iocco et al. | 244/139 |
| 6,439,256 B2 * | 8/2002 | Koelsch et al. | 137/68.13 |
| 6,648,371 B2 * | 11/2003 | Vendely et al. | 280/739 |
| 6,820,898 B2 * | 11/2004 | Dinsdale et al. | 280/737 |
| 6,886,776 B2 * | 5/2005 | Wagner et al. | 244/12.4 |
| 7,232,001 B2 * | 6/2007 | Hakki et al. | 180/271 |
| 7,954,752 B2 | 6/2011 | Smith et al. | |
| 2003/0062443 A1 | 4/2003 | Wagner et al. | |
| 2005/0077426 A1 * | 4/2005 | Simard | 244/107 |

FOREIGN PATENT DOCUMENTS

| | | |
|---|---|---|
| EP | 1403180 A2 | 3/2004 |
| JP | 5322496 A | 12/1993 |
| JP | 8192797 | 7/1996 |
| JP | 11268605 A | 10/1999 |
| WO | 2006046038 A2 | 5/2006 |
| WO | 2009001342 A2 | 12/2008 |
| WO | 2009054844 A1 | 4/2009 |

OTHER PUBLICATIONS

Extended European Search Report dated Aug. 6, 2012 from related European Patent Application No. 07844510.3.

REAPS Rotorcraft Protection, Brochure by RAFAEL Armament Development Authority, Ltd., Ordnance Systems Division, Haifa, Israel.

Kevin Coyne, F-111 Crew Module Escape and Survival Systems, pp. 1-10, http://www.f-111.net/ejection.htm.

"CABS Cockpit Air Bag System," Armor Holdings Aerospace & Defense Group, Jan. 2006.

Akif Bolukbasi, "Active Crash Protection Systems for UAVs," American Helicopter Society Annual Forum 63 Proceedings, Virginia Beach, VA, May 1-3, 2007.

Akif Bolukbasi, "Active Crash Protection Systems for Rotorcraft," Center for Rotorcraft innovation/National Rotorcraft Technology Center Program 2007 Year End Review, Phoenix, AZ, Feb. 19-20, 2008.

Specification for PCT/US09/51821 filed on Jul. 27, 2009.

Response to Invitation to Correct Defects for PCT/US09/51821 dated Sep. 16, 2009.

International Search Report for PCT/US09/51821 dated Sep. 11, 2009.

Specification for PCT/US06/43706 filed Nov. 8, 2006.

Response to Invitation to Correct Defects for PCT/US06/43706 dated Apr. 7, 2008.

Publication of PCT/US06/43706 dated May 8, 2008.

Search Report for PCT/US06/43706 dated Jul. 18, 2008.

International Preliminary Report on Patentability for PCT/US06/43706 dated Mar. 19, 2009.

Office Action from Canadian Application No. 2,628,380, dated Dec. 23, 2009.

Specification for PCT/US07/82140 filed on Oct. 22, 2007.

International Search Report for PCT/US07/82140 dated Apr. 18, 2008.

Article 34 Amendments for PCT/US07/82140 filed on Aug. 18, 2008.

International Publication for PCT/US07/82140 published on Apr. 30, 2009.

Article 34 Amendments for PCT/US07/82140 filed on Oct. 13, 2009.

Final Office Action for U.S. Appl. No. 12/089,884 mailed Dec. 8, 2010.

Notice of Allowance for U.S. Appl. No. 12/089,884 mailed Jan. 26, 2011.

Rejection Notice for Japanese Application No. 2008-542336, dated Feb. 23, 2011, 1 page.

Notification of the Decision to Grant a Patent Right for Patent for Invention issued by the Patent Office of the People's Republic of China for related Chinese Patent Application No: 200680041870.7 on Jan. 21, 2012.

First Examination Report from Corresponding Mexican Application No. MX/a/2008/0060008, dated Mar. 22, 2011; in office Apr. 6, 2011.

Second Examination Report from Corresponding Canadian Application No. 2,628,380, dated Feb. 8, 2011.

First Office Action in Chinese Application No. 200680041870.7, by the Chinese Patent Office, dated Apr. 29, 2011.

Extended European Search Report in related European patent application No. EP 09847899, 6 pages, mailed Feb. 4, 2013.

* cited by examiner

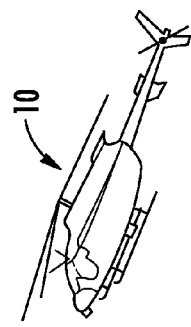
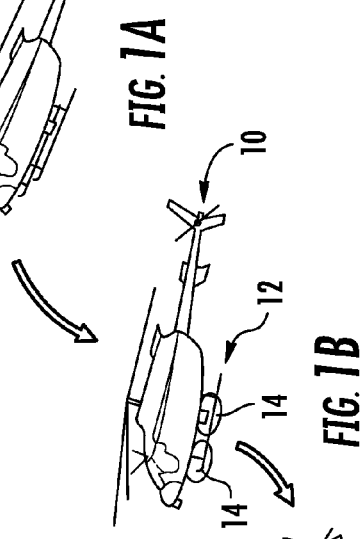
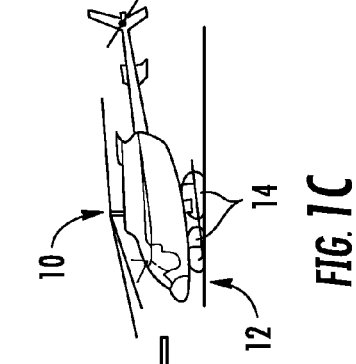
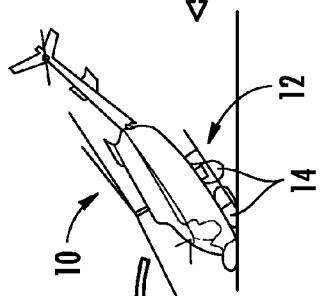
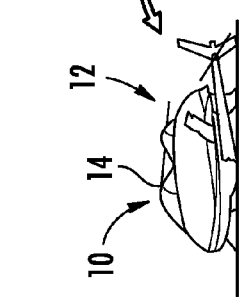

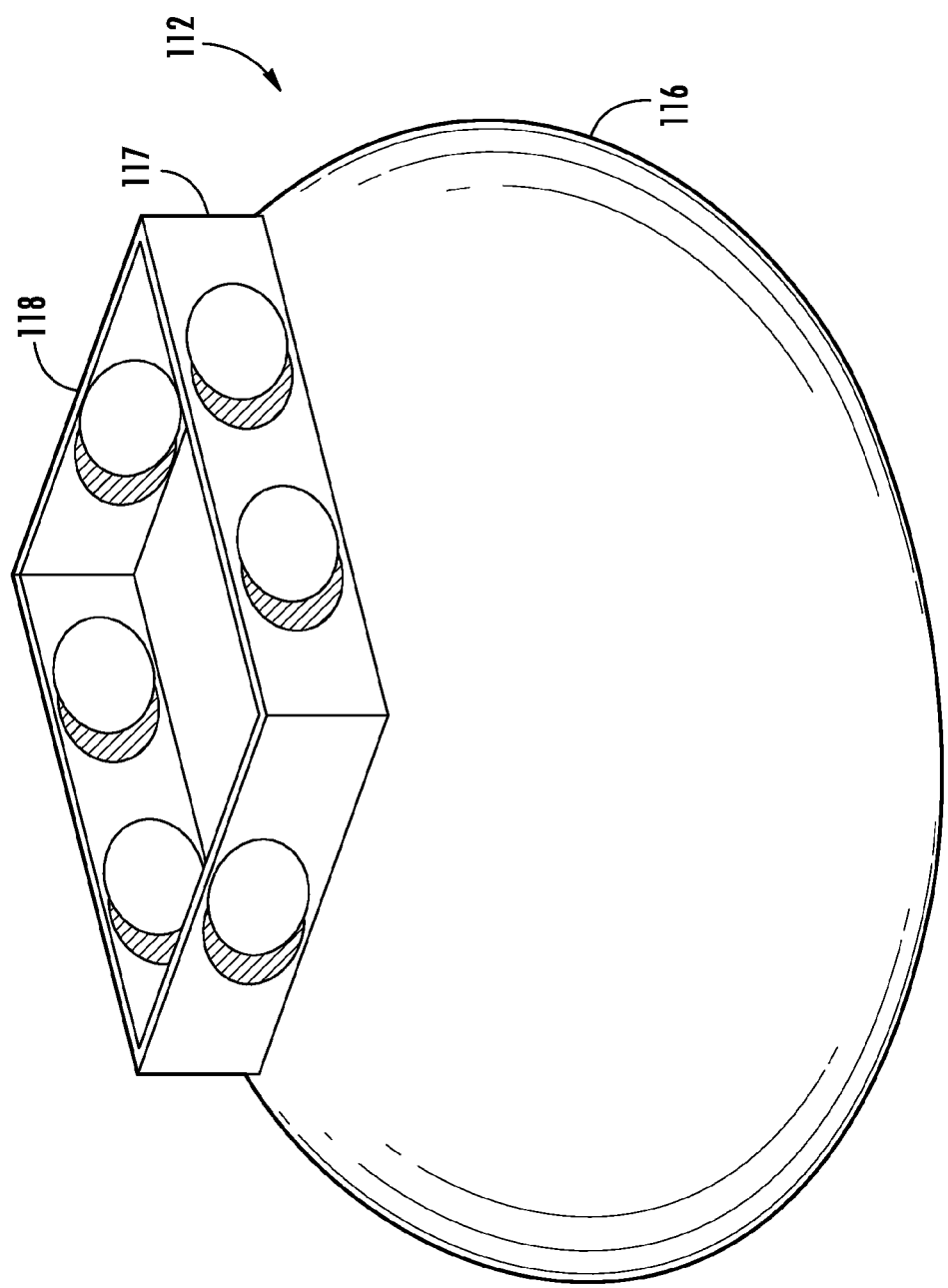

AIRCRAFT OCCUPANT PROTECTION SYSTEM

TECHNICAL FIELD

The present disclosure relates generally to aircraft safety systems, including safety systems that comprise crash attenuation systems for aircraft.

DESCRIPTION OF THE PRIOR ART

Currently internal airbags are used in the automotive industry within the occupied volume to mitigate occupant injuries. Similarly, external airbags have been used to attenuate decelerative loads to air and space vehicles, such as escape modules, upon contact with the ground or water. Examples include the NASA Mars Rovers and the crew module of the General Dynamics/Grumman F-111.

During impact, the gas in the airbag must be vented to prevent gas pressurization and subsequent re-expansion, which may cause the occupant to accelerate backward. This effect is commonly known as rebound. In addition, the gas may be vented to prevent over-pressurization, which can cause failure of the airbag. Venting may be accomplished, for example, through discrete vents or through a porous membrane that forms at least a portion of the skin of the airbag.

One shortcoming of prior external airbag systems is that they fail to prevent post-impact pitch-over, or "tumbling," of an aircraft having a forward and/or lateral velocity at impact with a hard surface. For example, referring to FIGS. 1a-1e, an aircraft 10 that is equipped with a prior external airbag system 12 is shown at different points during a crash sequence from (a) to (e). The crash sequence involves the aircraft 10 having both forward and downward velocities at (a) and (b). The airbag system 12 properly deploys its airbags 14 at (b), but still incurs serious damage due to pitch-over of the aircraft 10 as shown at (d) and (e). Thus, improvements are still needed in external airbag systems, particularly improvements to the pitch-over stability of an aircraft equipped with an external airbag system.

BRIEF DESCRIPTION OF THE DRAWINGS

For a more complete understanding of the present disclosure, including its features and advantages, reference is now made to the detailed description taken in conjunction with the accompanying drawings, in which:

FIGS. 1a-1e show a crash sequence for a helicopter equipped with a prior external airbag system;

FIG. 3 is a perspective view of an airbag used with the external airbag system shown in FIG. 2;

DESCRIPTION OF THE PREFERRED EMBODIMENT

The present disclosure provides for a number of safety improvements for aircraft, including an impact detection system, an impending crash detection system, and an inflatable crash attenuation system for an aircraft.

The inflatable crash attenuation system can comprise an airbag that is inflated prior to impact and controllably vented during impact so as to prevent aircraft pitch-over. The system can be used on a number of different types of aircraft, for example, helicopter, fixed wing aircraft, and other aircraft, and in particular those that are rotorcraft. The system improves on the prior art by providing automatic control of the venting valves based on sensed crash conditions, thereby effectively shifting the center of impact pressure and preventing aircraft pitch-over.

Figure 2:
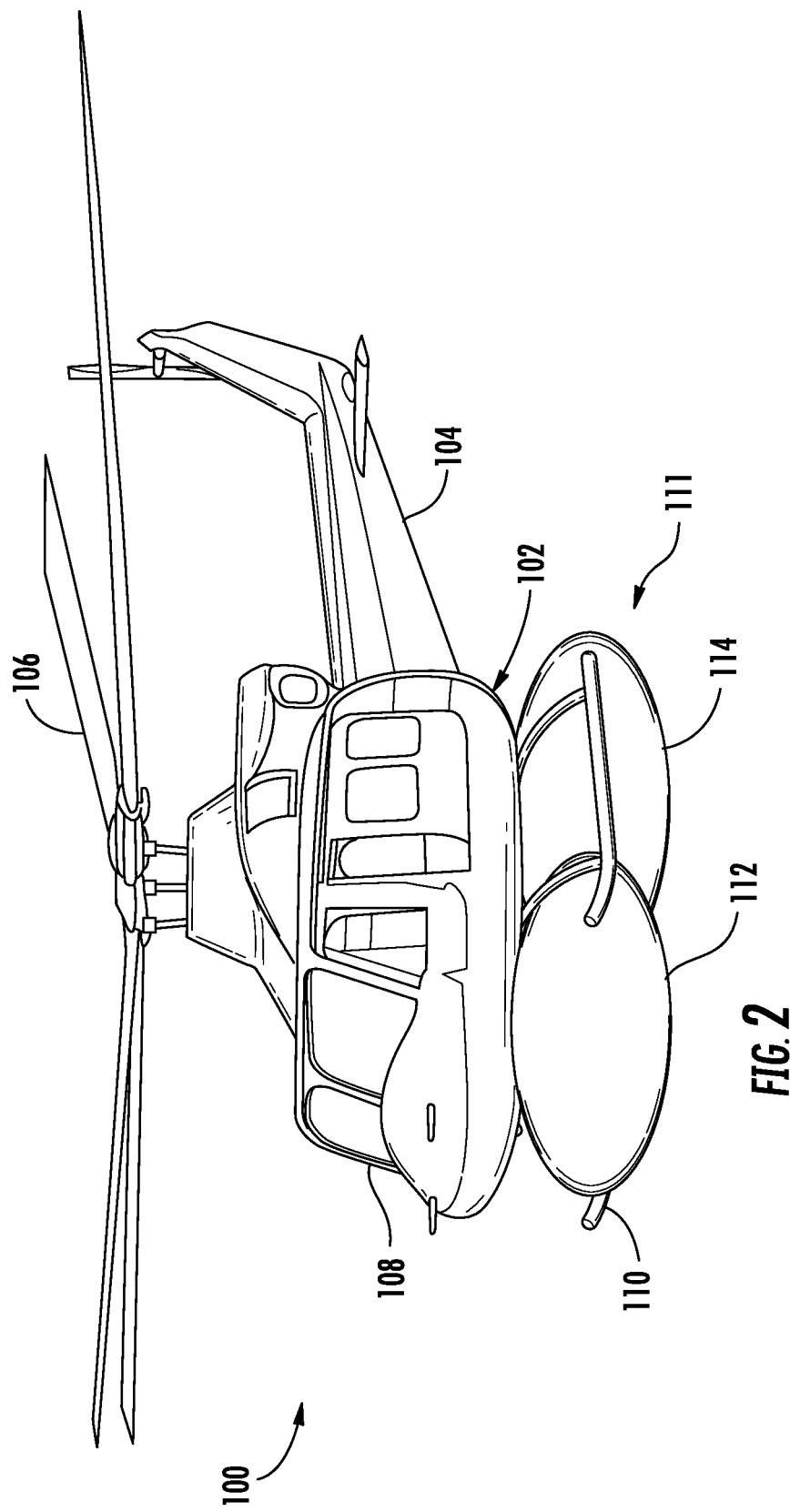
FIG. 2 is a perspective view of a helicopter equipped with an external airbag system.

FIG. 2 shows a helicopter 100 incorporating the crash attenuation system according to the present disclosure. Helicopter 100 comprises a fuselage 102 and a tail boom 104. A rotor 106 provides lift and propulsive forces for flight of helicopter 100. A pilot sits in a cockpit 108 in a forward portion of fuselage 102, and a landing skid 110 extends from a lower portion of fuselage 102 for supporting helicopter 100 on a rigid surface, such as the ground.

A problem with rotor 106 or the drive system for rotor 106 may necessitate a descent from altitude at a higher rate of speed than is desirable. If the rate is an excessively high value at impact with the ground or water, the occupants of helicopter 100 may be injured and helicopter 100 may be severely damaged by the decelerative forces exerted on helicopter 100. To reduce these forces, an airbag assembly 111 comprising inflatable, non-porous airbags 112, 114 is installed under fuselage 102. Though not shown in the drawings, airbags 112, 114 are stored in an uninflated condition and are inflated under the control of a crash attenuation control system (described below).

FIG. 3 is an enlarged view of airbag 112, which has a non-porous bladder 116, which is sealed to a housing 117 having a plurality of discrete vents 118. Airbag 112 is shown in FIG. 3, but it should be noted that airbags 112 and 114 can have generally identical configurations. In a preferred embodiment, the bladder 116 is formed of a fabric that comprises resilient material such as Kevlar and/or Vectran. Vents 118 communicate with the interior of bladder 116, allowing for gas to controllably escape from within the airbag 112. In the embodiment shown, vents 118 are open to the ambient air, though vents 118 may be connected to a closed volume, such as another airbag or an accumulator (not shown). Also, while a plurality of vents are shown in the embodiment illustrated in FIG. 3, alternative embodiments can include only a single vent 118.

Figure 4A:
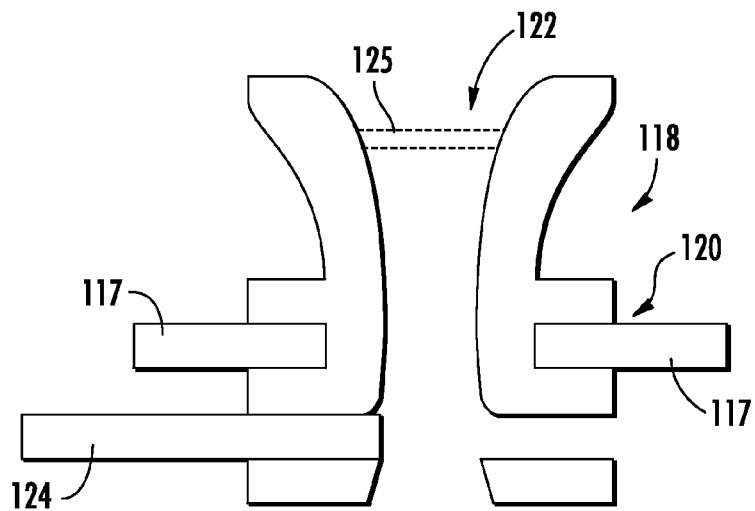
FIGS. 4a-4c are cross-sectional views of a vent valve in full-open, partially-open, and closed configurations, respectively.
Figure 4B:
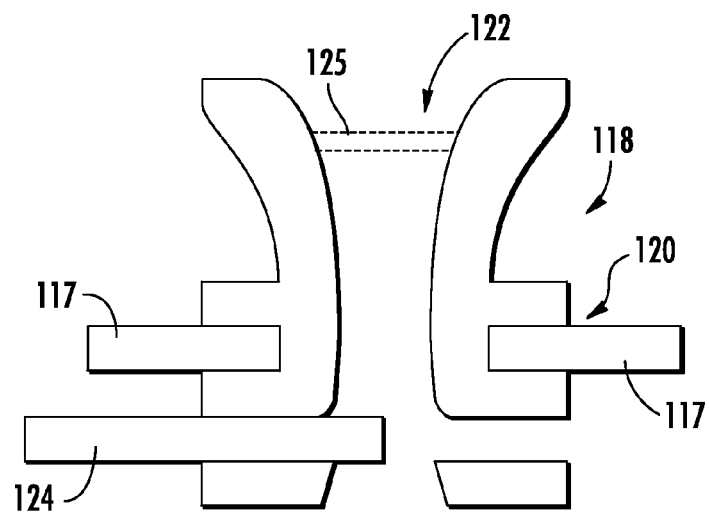
Figure 4C:
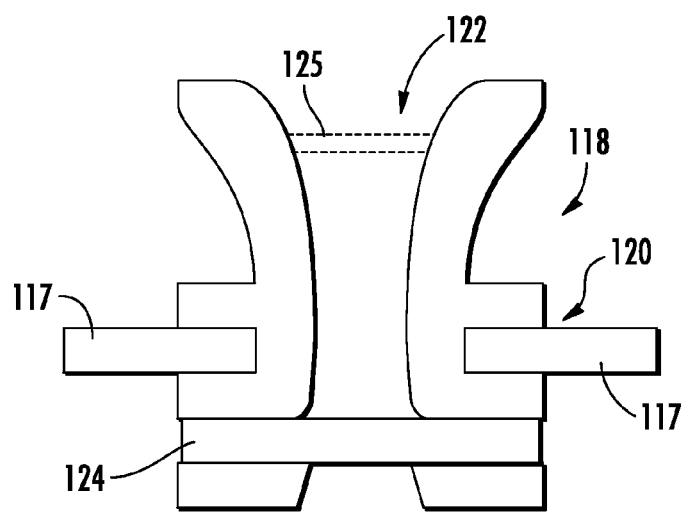

Referring to FIGS. 4a-4c, each vent 118 has a vent valve 120 for controlling the flow of gas through vent 118. Vent 118 and vent valve 120 together form a vent passage 122 for channeling gas flowing out of airbag 112. Each vent valve 120 is sealingly mounted in housing 117 (or bladder 116 in some embodiments) to prevent the leakage of gas around vent 118, which forces venting gas to flow through passage 122. A vent plate 124 is configured to be moveable between an open position, for example shown in FIG. 4a, at least one intermediate position, for example as shown in FIG. 4b, and a closed position, for example as shown in FIG. 4c. FIG. 4a shows vent plate 124 in the open position, or open state, in which a maximum amount of gas is allowed to flow through passage 122 from within airbag 112. FIG. 4b shows vent plate 124 in an intermediate position, or intermediate state, in which a selected amount of gas less than the maximum is allowed to flow through passage 122 from within airbag 112. FIG. 4c shows vent plate 123 in the closed position, or closed state, in which gas is prevented from flowing out of airbag 112 through the passage 122. Though only a single intermediate position is shown, it should be understood that various additional intermediate positions can be selected in order to control the amount of gas that is allowed to escape from within the airbag 112 through the vent 118. Also, while the vent valve 120 is shown as a sliding valve, it will be understood by one skilled in the art that vent valve 120 may alternatively be other suitable types of valves. Control of vent valves 120 may be accomplished though any number of means, including, for example, electrorheological means. In some embodiments, the vents 118 can be sealed with an optional pop-off pressure release mechanism, preferably a pressure sensitive fabric 125. In such embodiments, once the fabric 125 pops off, the vent valve 120 controls release of the pressurized air inside the airbag 112, 114.

Figure 5:
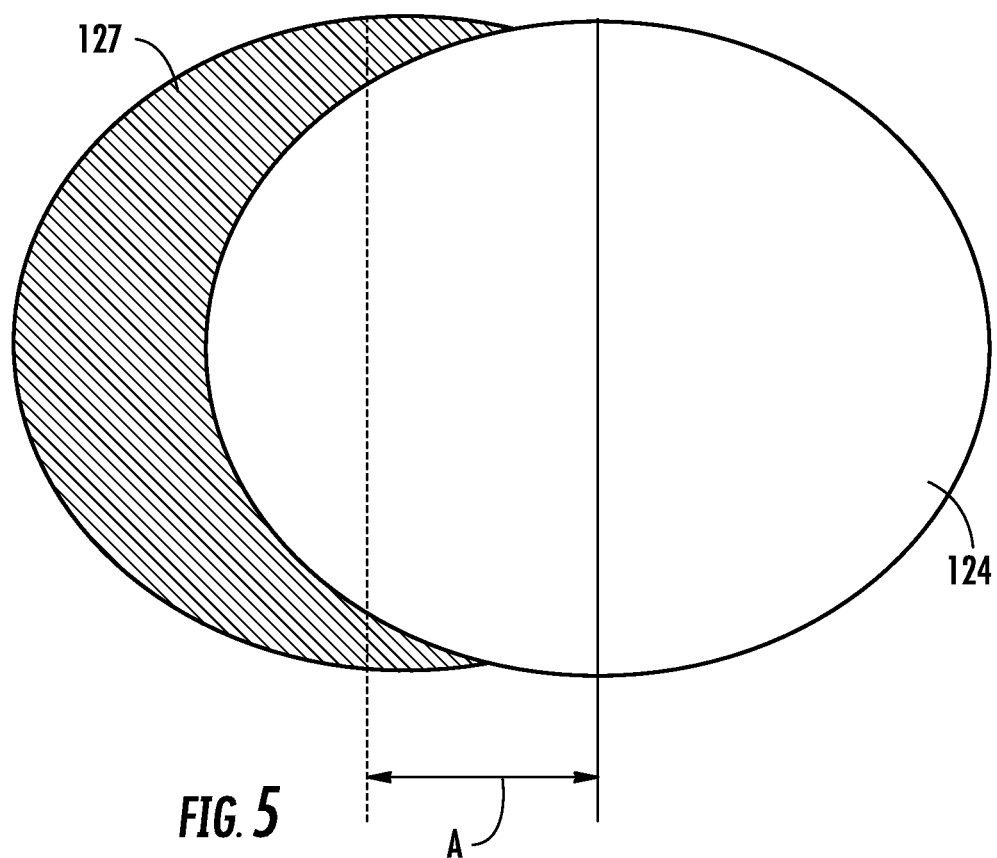
FIG. 5 is a diagram of the vent plate shown in FIGS. 4a-4c.

Referring next to FIG. 5, as will be discussed in greater detail below, each vent plate 124 can be selectively positioned to any position between a full open position and a full closed position. In the view shown in FIG. 5, the hatched area 127 represents the open vent area, through which gas can escape from within an airbag 112 or 114 through passage 122. The vent plate can be moved a distance A according to a desired amount of open vent area 127. The open vent area 127 will be a total open vent area "S" if there is only one vent 118; otherwise, the open vent area 127 of each vent 118 is summed to be a total vent area "S." The total vent area S is a function of crash conditions:

$$S = f(\dot{x}, \dot{z}, \theta, \phi, \dot{\theta}, \dot{\phi}, \Delta, \ldots)$$

where $\dot{x}$ represents forward velocity, $\dot{z}$ represents downward or sink velocity, $\theta$ represents pitch angle, $\phi$ represents roll angle, $\dot{\theta}$ represents pitch rate, $\dot{\phi}$ represents roll rate, and $\Delta$ represents the slope of the impact surface (e.g., the slope of the ground).

Figure 6:
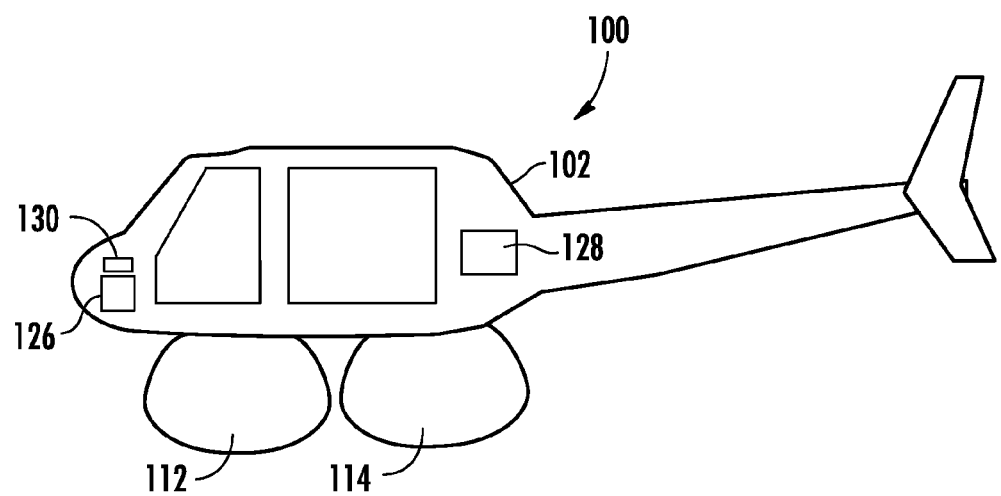
FIG. 6 is block diagram of the helicopter shown in FIG. 2.

FIG. 6 shows airbags 112 and 114 mounted to a lower portion of fuselage 102 and show additional components of the crash attenuation system according to the present disclosure. A computer-based control system 126, which is shown mounted within fuselage 102, is provided for controlling the operation of components associated with airbags 112, 114. Each airbag 112, 114 has a gas source 128, such as a gas generator, for inflation of the airbags 112, 114. In some embodiments, a secondary gas source, such as compressed gas tank (not shown), can be provided for post-crash re-inflation of airbags 112, 114 so that the airbags 112, 114 can be used as floatation devices in the event of a water landing. The gas source 128 may be of various types, such as gas-generating chemical devices or compressed air, for providing gas for inflating airbags 112, 114. In addition, the crash attenuation system has a sensor system 130 for detecting crash conditions used to determine the total vent area S, such as rate of descent and/or ground proximity. Airbags 112, 114 can also have a water-detection system (not shown), which may have sensors mounted on fuselage 102 for detecting a crash in water. Gas source 128, vent valves 120, and sensor system 130 are in communication with control system 126, allowing control system 126 to communicate with, monitor, and control the operation of these attached components. In addition, control system 126 may be in communication with a flight computer or other system for allowing the pilot to control operation of the crash attenuation system. For example, the pilot may be provided means to override, disarm, or arm the crash attenuation system.

The sensor system 130 is shown in FIG. 6 as a discrete component for the sake of convenience. However, it should be noted that actual implementations of the sensor system 130 can comprise a number of components that are located at various locations on the helicopter 100. The sensor system 130 can include, for example, sensors for detecting pitch and roll attitude, pitch and roll rate, airspeed, altitude, rate of descent, and slope of the impact surface.

Figure 7:
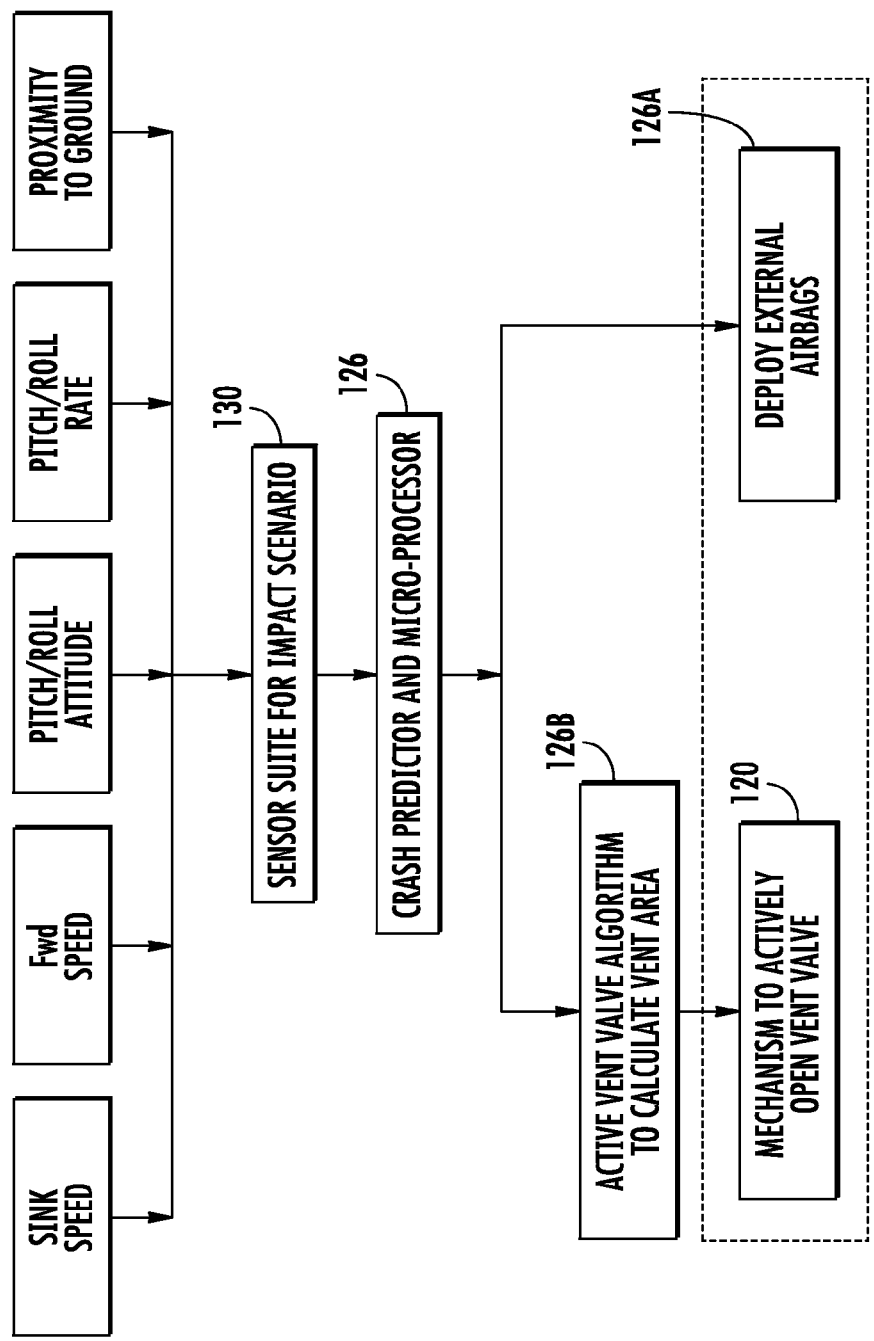
FIG. 7 is a block diagram illustrating the operation of the crash attenuation system of the helicopter shown in FIG. 2.

Referring next to FIG. 7, an exemplary embodiment of the sensor system 130 is configured to detect various crash conditions, which can include, for example, one or more of the sink speed, forward speed, pitch and roll attitude, pitch and roll rate, and proximity to the ground of the helicopter 100. The control system 126 receives data from the sensor system 130 representative of the detected crash conditions. In a preferred embodiment, the control system 126 is a microprocessor-based system configured to operate as a crash predictor. When excessive oncoming velocity of the ground within a certain altitude range is detected by the control system 126, the gas source 128 is triggered to inflate the airbags 112, 114 (indicated at box 126A) prior to impact of the helicopter 100 with the ground. At the same time, the control system 126 activates the vent valves 120 to adjust the open vent area based on an active vent valve algorithm as indicated at box 126B.

Figure 8:
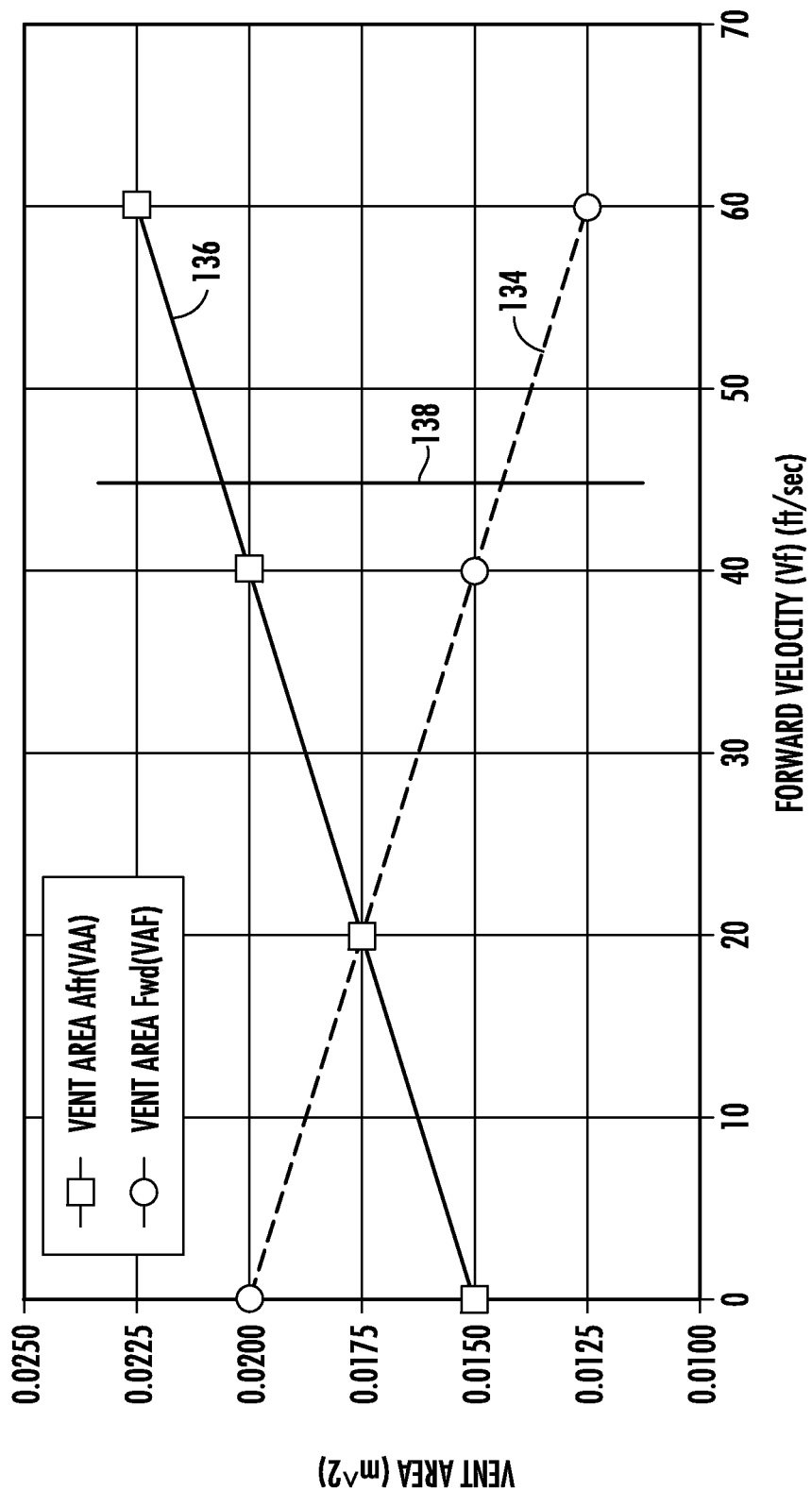
FIG. 8 shows a chart of exemplary data representative of a relationship between airspeed of the helicopter and open vent area.

FIG. 8 shows an example of a relationship that can be used by the control system 126 for adjusting the open vent areas at 126B. In FIG. 8, a chart is shown that illustrates a relationship between open vent area and forward velocity of a helicopter for a given sink velocity of 36 feet per second. The line 134 maps open vent areas to forward velocities for the forward airbag 112, while the line 136 maps open vent areas to forward velocities for the aft airbag 114. It should be appreciated that the relationship will vary for different sink velocities. The relationship will also vary depending on a number of other factors, for example aircraft characteristics, such as aircraft weight and balance, and the number and characteristics of the airbags. The data can be determined using known flight simulation techniques, for example simulation software, for simulating crash results. Using such techniques, data can be collected based on simulation of crash results for various crash conditions and open vent areas.

FIGS. 9a through 9d illustrate operation of the crash attenuation system. In operation, if an impending crash is sensed by sensor system 130, for example, by excessive oncoming rate of the ground within a certain attitude range, control system 126 triggers gas source 128 to inflate airbags 112, 114 at the appropriate time to allow inflation just as airbags 112, 114 contact the impact surface (ground or water).

Figure 9A:
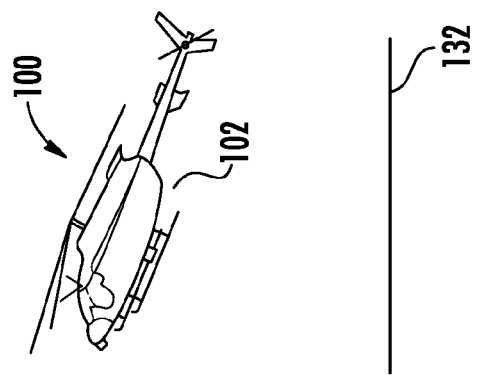
FIGS. 9a-9d show a crash sequence for a helicopter equipped with an external airbag system according to the present disclosure.
Figure 9B:
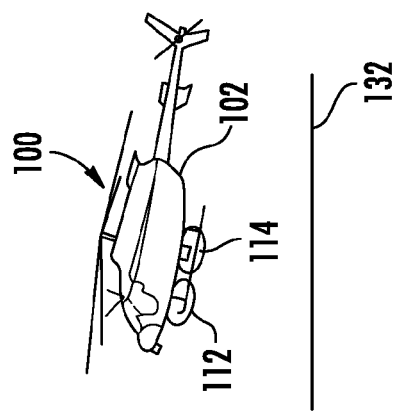
Figure 9C:
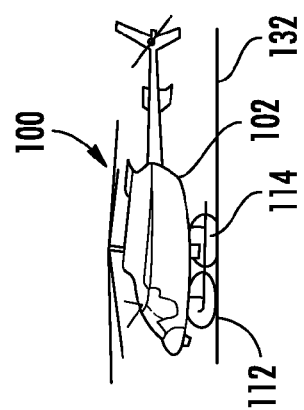
Figure 9D:
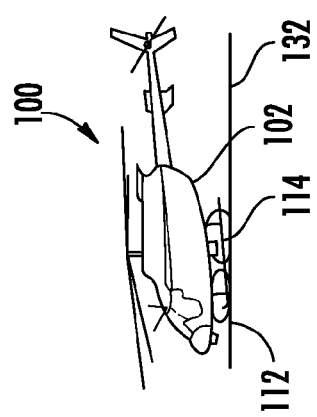

FIG. 9a shows an impending crash onto ground 132, which is sensed by the control system 126 based on data received from the sensor system 130. At FIG. 9b, gas source 128 is triggered, causing airbags 112 and 114 to inflate just prior to contact with ground 132. The control system 126 also calculates the open vent areas for each of the airbags 112, 114. In this case, the control system 126 determines that the crash conditions correspond to the line 138 shown in FIG. 8, which requires the open vent area of aft airbag 114 be greater than the open vent area of forward airbag 112. Accordingly, at FIG. 9c the open vent area of aft airbag 114 is set to an area of about 0.0205 square meters and the open vent area of forward airbag 112 is set to an area of about 0.0145 square meters. Thus, as shown in FIG. 9c, the aft airbag 114 deflates faster than the forward airbag 112. As a result, as shown at FIG. 9d, the helicopter 100 comes to a stop without experiencing a pitch-over.

Figure 10:
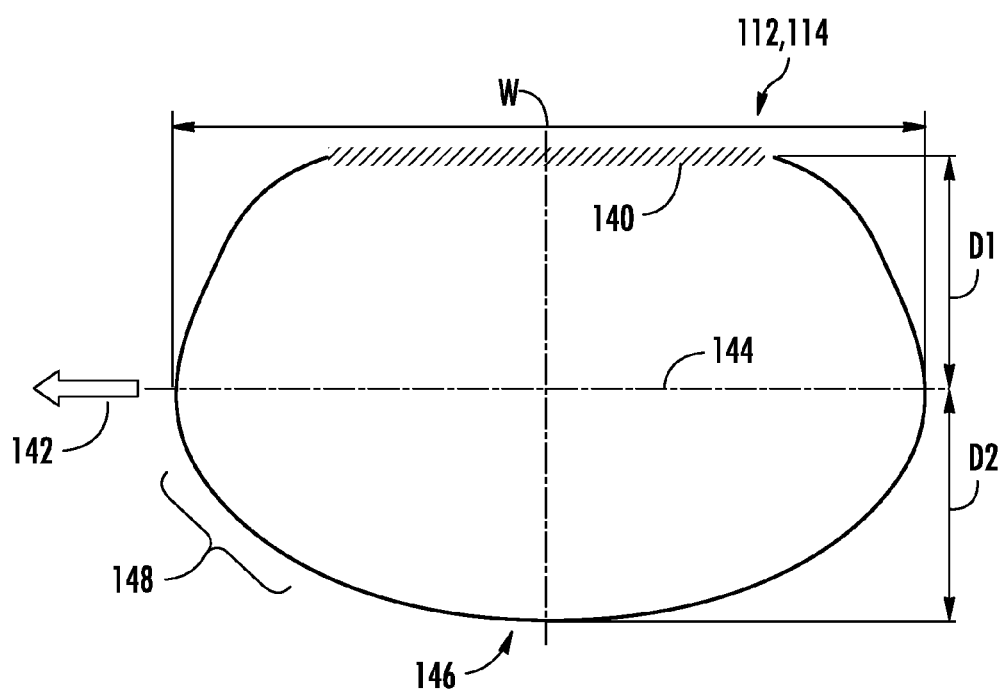
FIG. 10 shows a cross-sectional view of an airbag of the external airbag system of the present disclosure.

Referring next to FIG. 10, a cross-section of a preferred embodiment of an airbag 112, 114 is shown. The hatched area 140 represents the portion of the airbag 112, 114 that is adjacent to the underside of the fuselage 102. The arrow 142 points towards the forward end of the helicopter 100. The broken line 144 is the widest portion of the airbag 112, 114 between the top (hatched area 140) and bottom 146 of the airbag 112, 114. As shown in FIG. 10, for a width W of the airbag at line 144, the distance D1, which is the distance between the top 140 and the line 144, and the distance D2, which is the distance between the bottom 146 and the line 144, are equal and determined based on the following relationship:

$$D1, D2 = \frac{W}{2\sqrt{3}}$$

This geometry maximizes crush distance for optimal energy absorption management. Also, the curved region 148 provides anti-plow, anti-scooping geometry to assist in preventing pitch-over of the helicopter 100.

Figure 11:
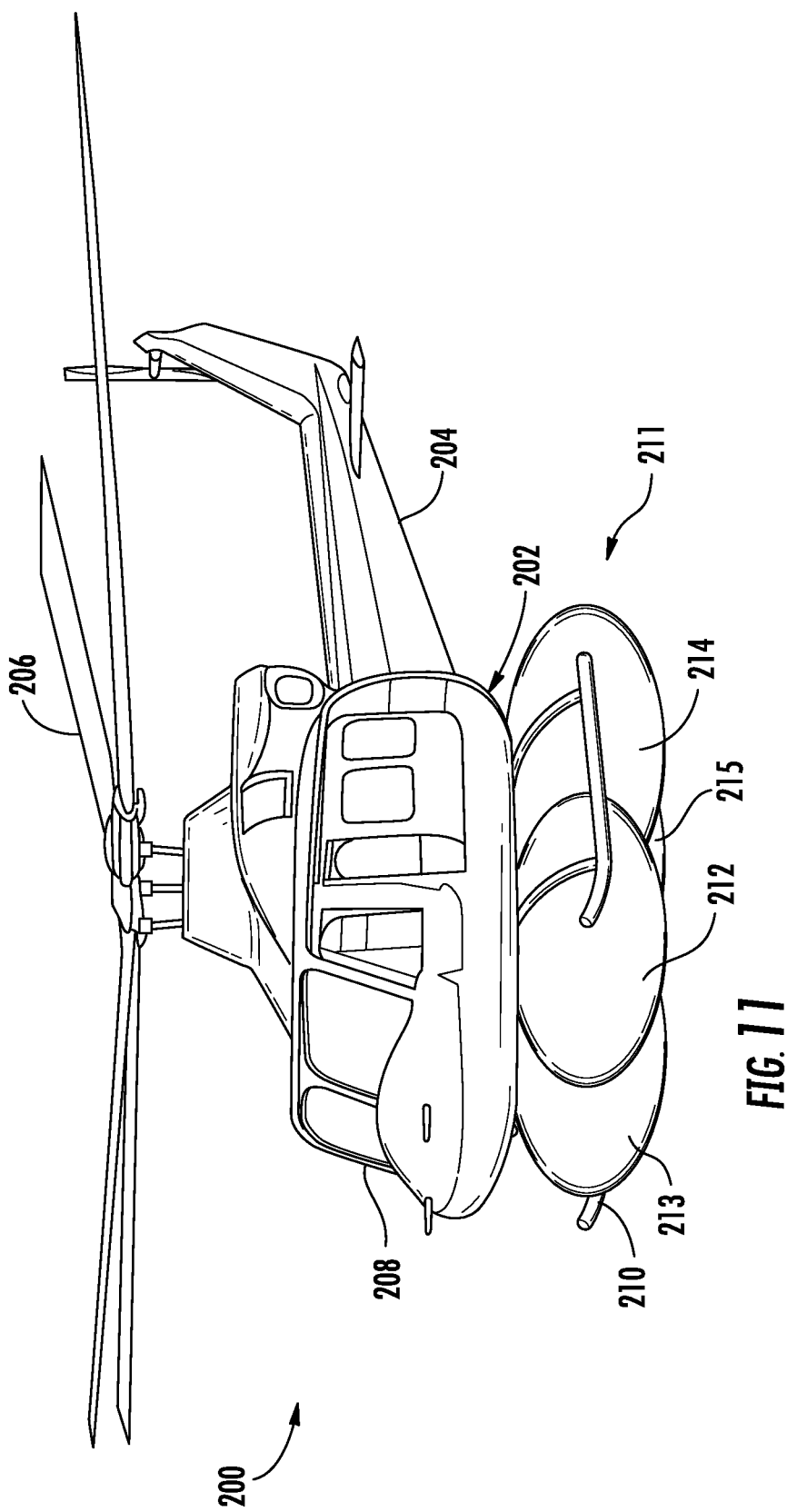
FIG. 11 shows a perspective view of a helicopter equipped with an alternative external airbag system.

Referring next to FIG. 11, an alternative embodiment of the helicopter 200 is shown. As mentioned above, while the present crash attenuation system has been discussed primarily in connection with two airbags 112, 114, alternative embodiments can have additional airbags. For example, the helicopter 200 shown in FIG. 11 has an airbag assembly 211 comprising four airbags 212, 213, 214, and 215. Like the helicopter 100, the helicopter 200 comprises a fuselage 202 and a tail boom 204. A rotor 206 provides lift and propulsive forces for flight of helicopter 200. A pilot sits in a cockpit 208 in a forward portion of fuselage 202, and a landing skid 210 extends from a lower portion of fuselage 202 for supporting helicopter 200 on a rigid surface, such as the ground.

A problem with rotor 206 or the drive system for rotor 206 may necessitate a descent from altitude at a higher rate of speed than is desirable. If the rate is an excessively high value at impact with the ground or water, the occupants of helicopter 200 may be injured and helicopter 200 may be severely damaged by the decelerative forces exerted on helicopter 200. To reduce these forces, inflatable, non-porous airbags 212, 213, 214, and 215 are installed under fuselage 202. Though not shown in the drawings, airbags 212, 213, 214, and 215 are stored in an uninflated condition and are inflated under the control of a crash attenuation control system.

The crash attenuation system of the helicopter 200 can operate as discussed above in connection with the helicopter 100. In addition, compared to the helicopter 100, the helicopter 200 provides additional lateral roll-over prevention capabilities. Each of the airbags 212, 213, 214, and 215 is independently actively vented during a crash sequence. Thus, if the helicopter 200 is approaching the ground with a lateral velocity, the airbags 212 and 214, which are located along one side of the helicopter 200, can be vented more or less than the airbags 213 and 215, which are located along the other side of the helicopter 200, as necessary based on detected crash conditions in order to prevent the helicopter 200 from rolling over after impact with the ground.

The above disclosure describes a system and method for actively controlling the venting of external airbags based on sensed crash conditions, such as airspeed, sink speed, pitch attitude, roll attitude, pitch rate, and roll rate. This active venting of the external airbags causes different airbags located at different locations of an aircraft exterior to deflate at different rates upon impact, thereby shifting an aircraft's center of impact pressure.

Figure 12:
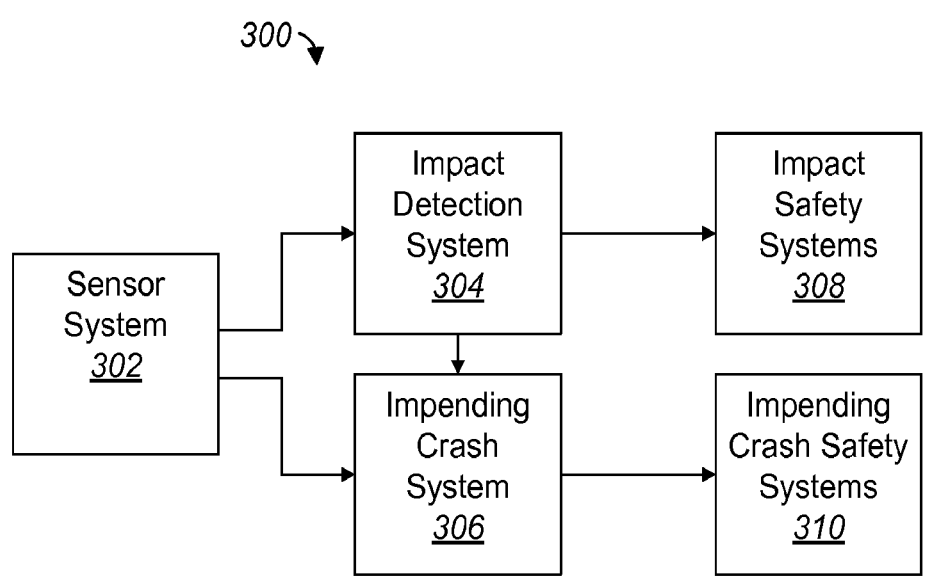
FIG. 12 shows a block diagram of an occupant protection system.

Turning next to FIG. 12, a block diagram shows an occupant protection system (OPS) 300. The OPS 300 provides a control system that computes various impact scenarios (forward/vertical velocities, pitch/roll attitudes, pitch/roll velocities, impact angle, and likely surface characteristics) based upon signals detected by various sensors 302, electronic maps, and other available data. The control system algorithm is then used to actively control and schedule various safety systems throughout the aircraft. The OPS 300 includes a sensor system 302, which can serve as an embodiment of the sensor system 130 described above. The OPS 300 also includes an impact detection system 304 and an impending crash detection system 306, either one or both of which can serve as the control system 126 described above. The impending crash detection system 306 is configured for detecting an imminent crash, while the impact detection system 304 is configured for detecting the actual occurrence of a crash.

The impending crash detection system 306 is in communication with one or more sensors of the sensor system 302. While the aircraft is in flight, the impending crash detection system 306 can be configured for periodically receiving information from one or more sensors of sensor system 302 as well as other available data from other aircraft systems. The crash detection system 306 is configured to evaluate the received information and determine whether there is excessive oncoming velocity of the ground within a certain altitude range, as would occur in the event of an imminent impact. If an impending crash is detected, the crash detection system 306 is configured to communicate with one or more impending crash safety systems 310 in order to initiate a series of actions to protect the occupants of the aircraft.

The impact detection system 304 is configured for detecting whether an actual impact is occurring or has occurred. While the aircraft is in flight, the impact detection system 304 can be configured for periodically receiving information from one or more sensors of sensor system 302 as well as other available data from other aircraft systems. The impact detection system 304 is configured to evaluate the received information and determine whether an impact is occurring or has occurred, for example by detecting a sudden stop or drop in forward and/or downward velocity as would occur during an impact. If an impact is detected, the impact detection system 304 is configured to communicate with one or more impact safety systems 308 in order to initiate a series of actions to protect the occupants of the aircraft.

Figure 13:
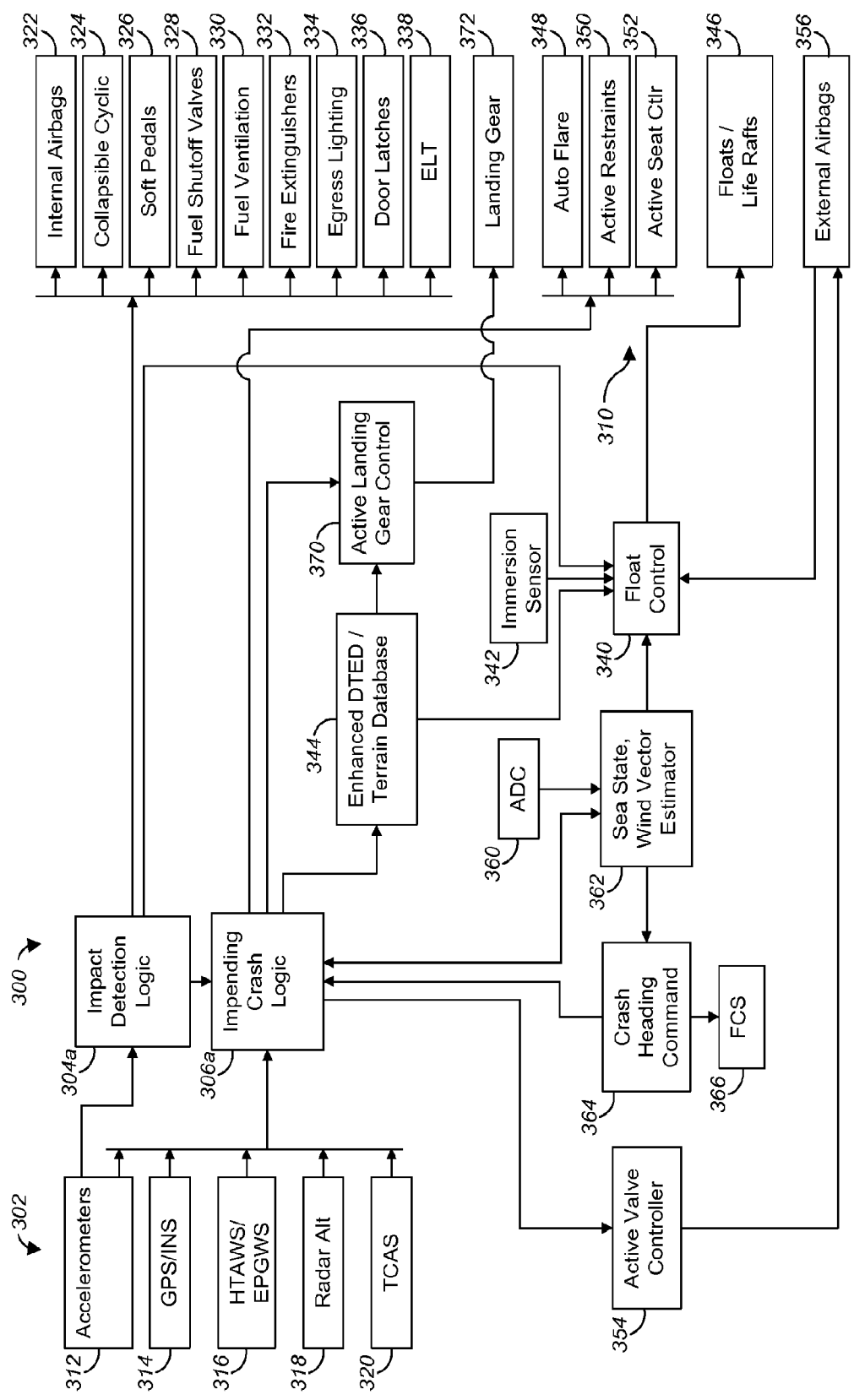
FIG. 13 shows a block diagram of a more detailed embodiment of the occupant protection system shown in FIG. 12.

Turning next to FIG. 13, a more detailed block diagram shows an example of an embodiment of the OPS 300. In the illustrated embodiment, the sensor system 302 includes one or more of the following: one or more accelerometers 312, a Global Positioning System (GPS) and/or Inertial Navigation System (INS) 314, a Helicopter Terrain Awareness Warning System (HTAWS) and/or Enhanced Ground Proximity Warning System (EGPWS) 316, an altimeter 318, and a Transponder Collision Avoidance System (TCAS) 320.

Impact detection system 304 includes impact detection logic 304a, which receives and evaluates data from one or more accelerometers 312. Data from the accelerometers 312 can be evaluated by the impact detection system 304 in order to determine whether an impact is occurring or has occurred. If an actual impact is detected, the impact detection system 304 can control one or more of the impact safety systems 308 to take one or more predetermined actions that would be desirable in the event of a crash. FIG. 13 shows the following examples of impact safety systems 308: internal airbags 322, collapsible cyclic stick 324, soft pedals 326, fuel shutoff valves 328, fuel ventilation 330, fire extinguishers 332, egress lighting 334, door latches 336, and an Emergency Locator Transmitter (ELT) 338.

The impact safety systems 308 can include conventional systems or systems that improve on conventional systems. For example, the internal airbags 322 can be of the type known in the art for use in aircraft and automobiles in order to help prevent injuries during a crash.

A collapsible cyclic stick is disclosed in U.S. Pat. No. 5,431,361 to Carnell et al., which is hereby incorporated by reference. The collapsible cyclic stick disclosed by Carnell et al. is designed for use in combination with an energy attenuating stroking crew seat. The Carnell et al. cyclic stick is mechanically connected to the seat such that the cyclic stick is displaced as a result of the stroking action of the seat during a severe crash. The collapsible cyclic stick 324 can be similar to the Carnell cyclic stick, except that an actuator or the like is used to displace or collapse the collapsible cyclic stick 324 according to control signals from the impact detection system 304. Similarly, the soft pedals 326 are controllable by the impact detection system 304 to collapse, displace, or become freely movable if an impact is detected. These measures help prevent injury to the pilot during a crash that could otherwise occur due to forceful contact with the cyclic stick and/or pedals.

A number of systems are controlled in order to reduce the risk of fire during and after an impact. For example, the fuel shutoff valves 328 can be controlled to close and/or the fuel pump can be shut off, for example via a Full Authority Digital Engine Control (FADEC) if the aircraft is so equipped. Similarly, fuel ventilation 330 can be closed in order to prevent the release of flammable vapors into a crash environment that might include ignition sources, such as sparking from damaged wiring. Also, fire extinguishers 332 can be armed and/or activated.

Other systems can be controlled for making it easier for the pilots and crew to exit the aircraft, such as activation of egress lighting 334, unlocking and/or opening door latches 336. An active rotor brake can stop the rotating blades overhead to protect the occupant's heads. An automatic seatbelt release would speed egress in the event of a water landing and the aircraft filling with water. Finally, an Emergency Locator Transmitter (ELT) 338 can be activated for allowing the aircraft to be located by search parties.

In addition, the impact detection system 304 can issue an impact detection signal to a float control 340. The float control 340 also receives data from an immersion sensor 342 and from a terrain database 344. Based on the received data, the float control 340 can be configured to activate external airbags and/or life rafts 346 in the event of a water landing or crash. Floats would be configured to preserve the breathable airspace within the aircraft in case the aircraft rolls or flips over.

These and other systems can be activated by the impact detection system 304 since they are desirable in the event of an actual crash, but should not be activated unless an actual crash has occurred because they would hinder the operation of the aircraft. Other systems designated as impending crash safety systems 310 can be controlled for improving safety during impact, but do not hinder operation of the aircraft so they can be activated earlier than the impact safety systems 308 before an actual crash has occurred.

Impending crash detection system 306 includes impending crash detection logic 306a, which receives and evaluates data from sensor systems 302, which can include one or more accelerometers 312, GPS and/or INS 314, HTAWS and/or EPGWS 316, radar altimeter 318, and TCAS 320. The impending crash detection system 306 also receives airspeed data from air data computer (ADC) 360 via a sea state, wind vector estimator 362. Data from the sensor system 302 can be evaluated by the impending crash detection system 306 in order to determine whether an impact is likely to occur. If an impending crash is detected, the impending crash detection system 306 can control one or more of the impending crash safety systems 310 to take one or more predetermined actions that would be desirable in the event of an impending crash. FIG. 13 shows the following examples of impending crash safety systems 310: automatic flare system 348, active restraint system 350, active seat control system 352, as well as a crash attenuation system, which can be a crash attenuation system according to any of the embodiments disclosed herein, having an active vent controller 354 and external airbags 356.

The impact safety systems 308 can include conventional systems or systems that improve on conventional systems. For example, the automatic flare system 348 can be of the type of maneuver known for decelerating the helicopter in order to reduce forward speed and decrease the rate of descent. The impending crash detection system 306 can also send data to a crash heading command controller 364, which can determine a vehicle state (velocities, rates, accelerations, etc) and make adjustments to the flight control system 366. The active restraint system 350 can include a haul-back restraint system where shoulder restraints are retracted in order to straighten the spine of the pilot or crewmember. This helps to properly position the person for impact in order to reduce the chances of a back or neck injury to the extent possible. The active seat control system 352 can be activated to control seats to stroke downwardly during a crash in order to absorb some of the force of impact. The impending crash detection system 306 can also activate an active landing gear controller 370 to extend and stiffen landing gear 372 for maximum energy absorption.

Turning now to FIGS. 14-21, various embodiments of venting systems for the crash attenuation systems disclosed herein will be described. While the venting system is described below in connection with a single airbag, it should be appreciated that multiple venting systems can be used with multiple airbags on a single aircraft. For example, the venting systems shown in FIGS. 14-21 can be used with a two-airbag crash attenuation system such as the one shown in FIG. 2, and can also be used with a four-airbag crash attenuation system such as the one shown in FIG. 11.

Figure 14:
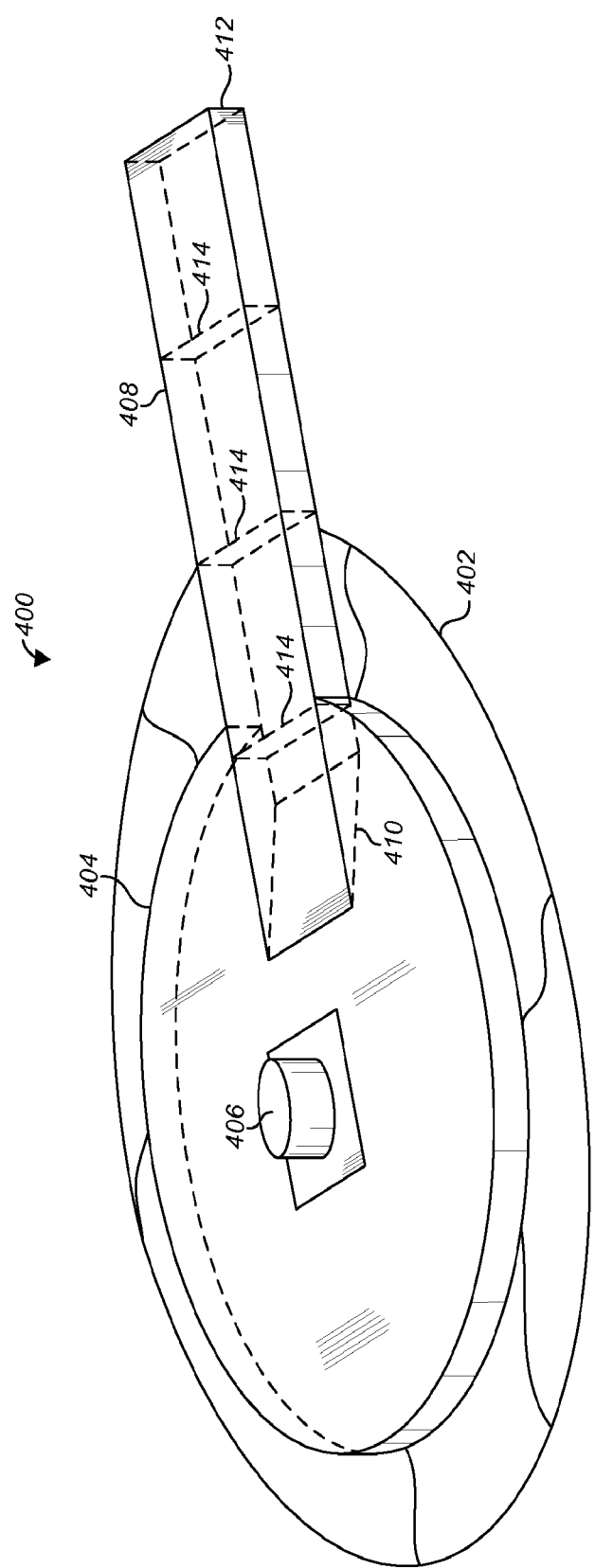
FIG. 14 shows a partial top view of a venting system for a crash attenuation system.

FIG. 14 shows a partial top view of a venting system 400 for a crash attenuation system comprising an airbag 402 (partially shown in FIG. 14) and a housing 404. The venting system 400 would ordinarily be disposed on the underside of an aircraft; however, no aircraft is shown in FIG. 14 in order to allow for an unobstructed view of the venting system 400. The airbag 402 can be identical to airbags 112 and 114, and the housing 404 can be identical to the housing 117. The venting system 400 is configured for controlling whether gas is allowed to escape from within the airbag 402 and housing 404. The venting system 400 can be controlled by a control system such as control system 126 or controller 354 as described above. FIG. 14 also shows an inflator 406 that is controllable by a control system, such as control system 126 or controller 354, for inflating the airbag 402.

The venting system 400 includes a vent passage 408. The vent passage 408 is formed by rigid substrates, for example formed of sheet metal or another rigid material. The vent passage 408 extends between a first opening 410 within the housing 404, and a second opening 412 external to the airbag 402 and housing 404. One or more vent valves 414 are disposed within the vent passage 408. The vent valves 414 can include active valves that are controllable for regulating the flow of air through the vent passage 408 as described above in connection with vent 118. The vent valves 414 can also include pop-off valves that are designed to burst under the force of a predetermined amount of air pressure.

Figure 15:
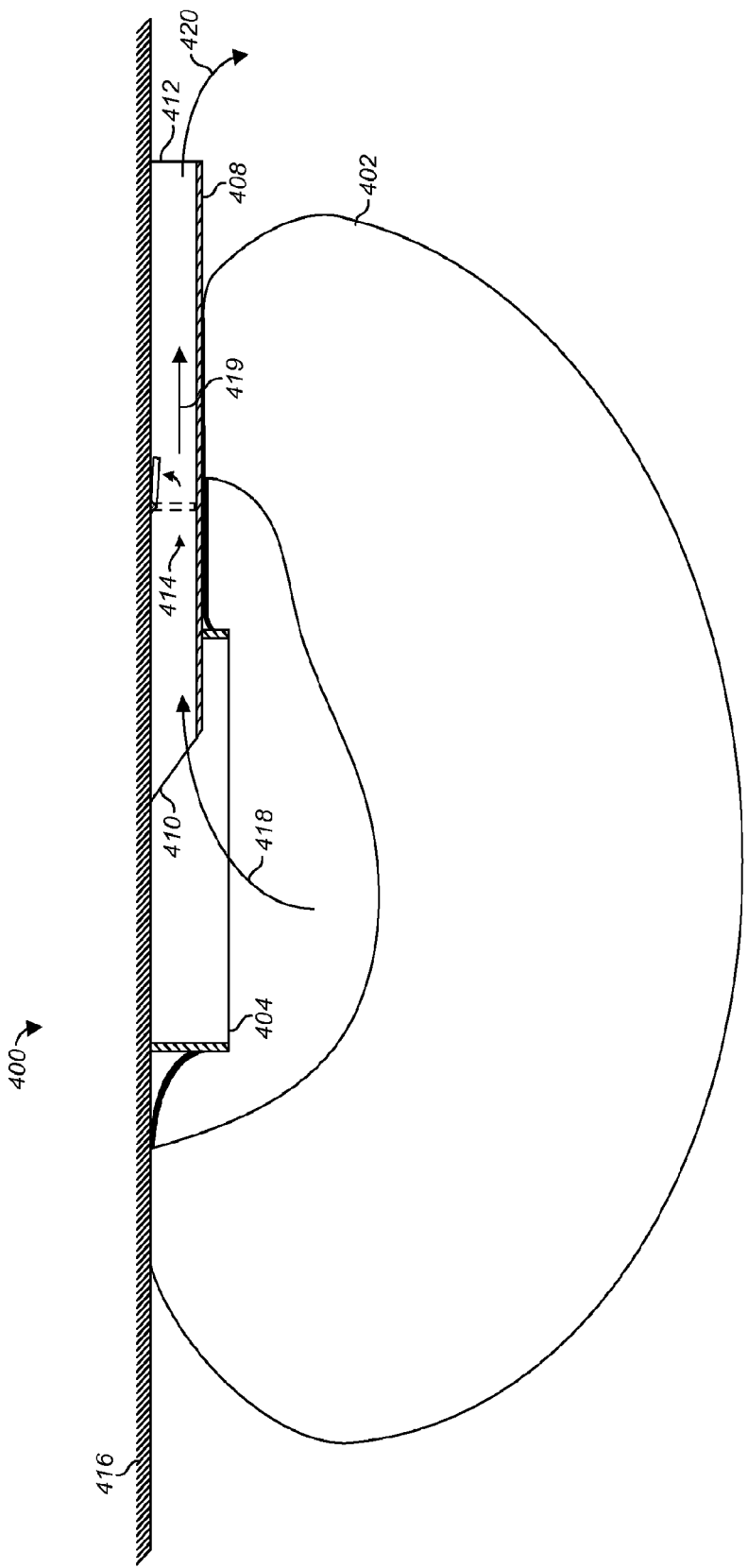
FIG. 15 shows a partially sectioned side view of a first embodiment of the venting system shown in FIG. 14.

Turning next to FIG. 15, a partially-sectioned side view is shown of venting system 400, as well as airbag 402 and housing 404 all supported by an aircraft fuselage 416. In this embodiment, the upper side of the vent passage 408 is flush with the under side of the fuselage 416. In FIG. 15, the airbag 402 is inflated and supporting at least a portion of the fuselage 416. In this situation, the airbag 402 is compressed by the weight of the aircraft and the upper portion of the airbag 402 is pressed against the under side of the fuselage 416 and the vent passage 408. The vent passage 408 is at least long enough to extend beyond the upper portion of the airbag 402. Otherwise, the upper portion of the airbag 402 would form a seal that could prevent air from escaping from within the airbag 402.

In FIG. 15, the vent passage includes a vent valve 414 that can be controlled to move to any position between the fully open position shown in solid lines and the fully closed position shown in broken lines. As discussed above in connection with vent 118 and vent valve 120, various intermediate positions of the vent valve 414 between the fully opened and fully closed positions can be selected in order to control the amount of gas that is allowed to escape from within the airbag 402 through the vent passage 408. While the vent valve 414 is fully or partially opened, air can escape from within the airbag 402 through the vent passage as indicated by arrows 418-420. While the vent valve 414 is fully closed, the vent passage 408 is sealed by the vent valve 414 so that air cannot escape through the vent passage 408. Also, in the event of a water landing, the vent valve 414 can be fully closed in order to both retain air within the airbag 402 and prevent the airbag 402 from filling with water. As shown in FIG. 14, alternative embodiments can include multiple vent valves 414 in series.

Figure 16:
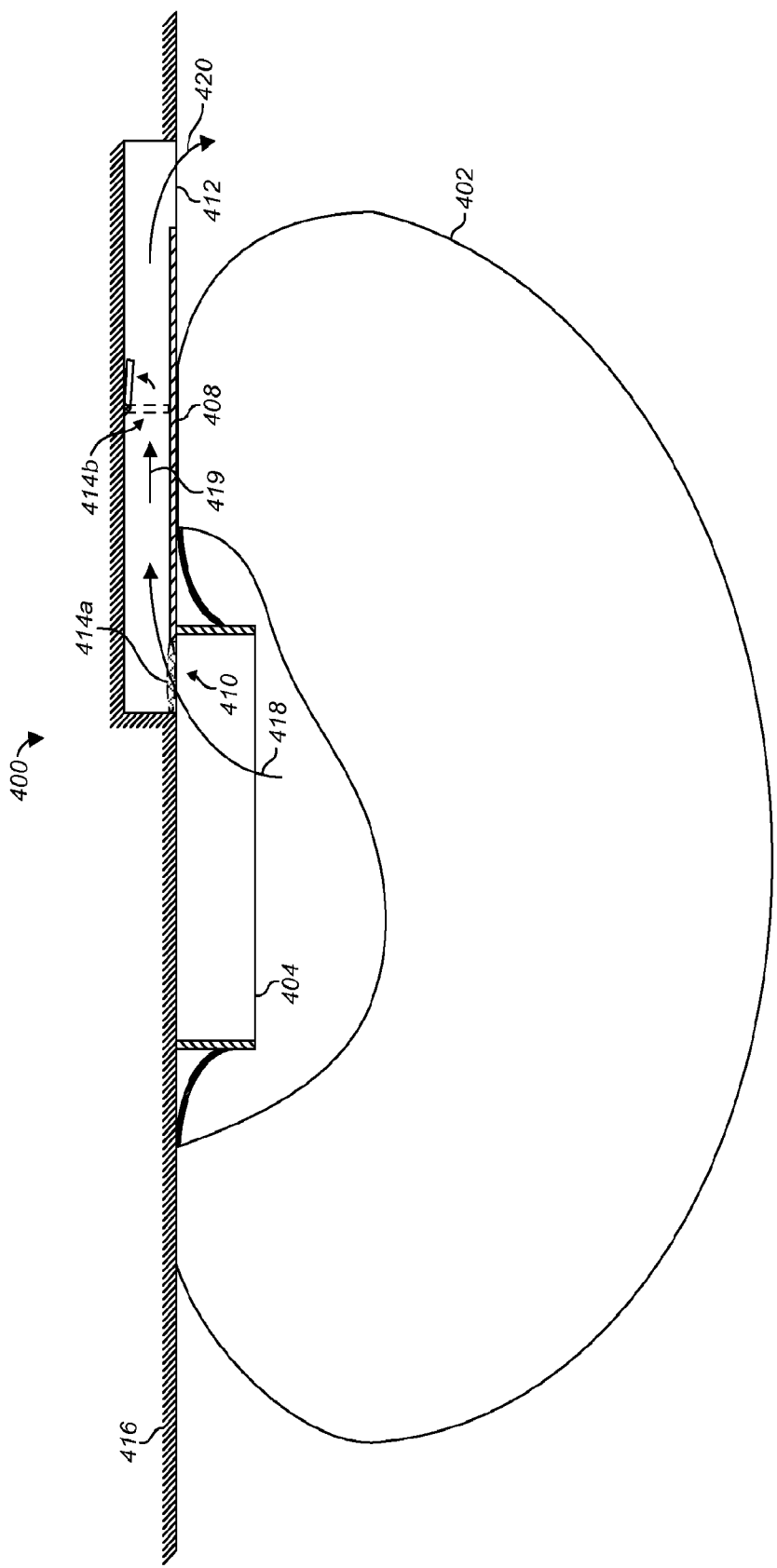
FIG. 16 shows a partially sectioned side view of a second embodiment of the venting system shown in FIG. 14.

Turning next to FIG. 16, an alternative embodiment is shown wherein the vent passage 408 is at least partially contained within the fuselage 416 of the aircraft. While the bottom side of the vent passage 408 is shown flush with the under side of the fuselage 416, in alternative embodiments the vent passage 408 can extend through other portions of the aircraft. In the illustrated embodiment, the second opening 412 opens to the under side of the fuselage 416. In alternative embodiments, the second opening can open to the top, side, or other part of the aircraft so long as the second opening will not be obstructed by the airbag 402.

The embodiment shown in FIG. 16 also shows an example of an embodiment of the venting system 400 having multiple vent valves 414. The venting system 400 as shown in FIG. 16 includes a pop-off vent valve 414a, which serves as an example of a pop-off pressure release mechanism, in series with an active vent valve 414b. Still further embodiments can include any number of vent valves 414 as desired.

Figure 17:
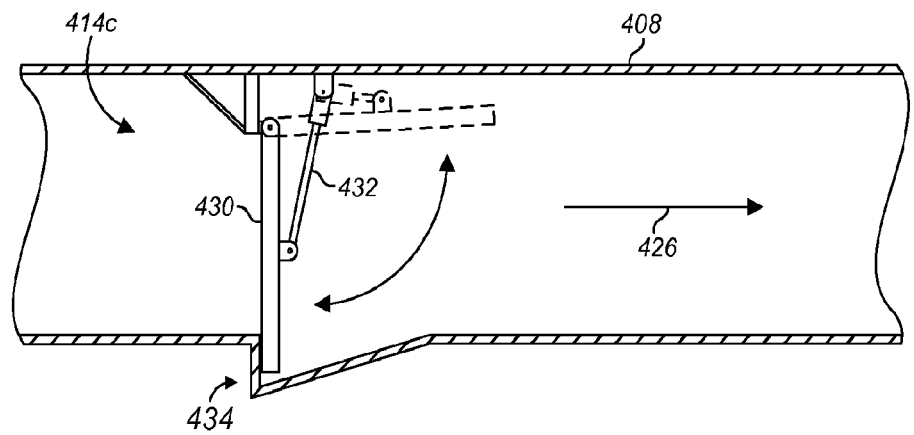
FIG. 17 shows a cross-sectional side view of the vent passage of the venting system shown in FIG. 14, illustrating a first embodiment of a vent valve for the venting system.
Figure 18:
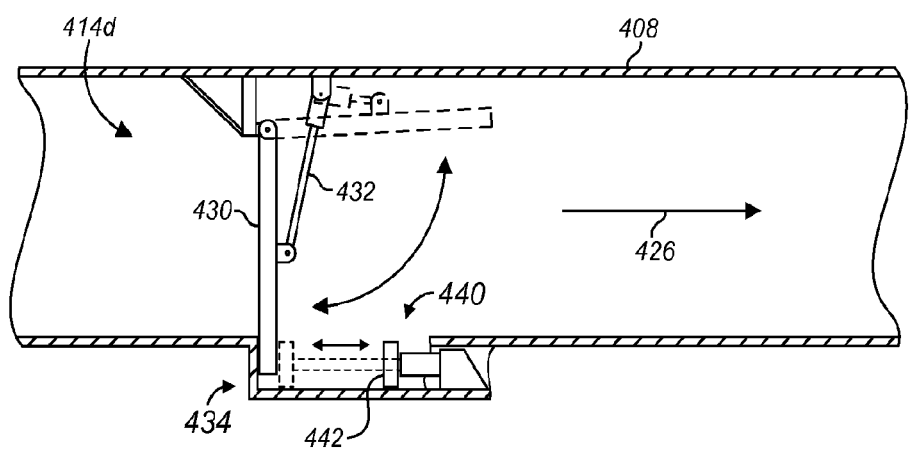
FIG. 18 shows a cross-sectional side view of the vent passage of the venting system shown in FIG. 14, illustrating a second embodiment of a vent valve for the venting system.

Turning next to FIGS. 17 and 18, more detailed views are shown of examples of embodiments of active vent valves 414c and 414d, respectively, that can be used with the venting system 400 in combination with, or in place of, the active vent valve 120 described above in connection with vent 118. It should be appreciated that these are only examples, and that many modifications are possible to these embodiments, and that there are many other types of controllable valves can be used as an active vent valve 414.

Referring to FIG. 17, vent valve 414c is an embodiment of an active vent valve 414 that can be controlled to be fully opened (shown in phantom), fully closed (shown in solid lines), or partially opened to any of a continuous range of partially-opened positions between the fully open and fully closed positions for regulating the flow of air through the vent passage 408. In the view shown in FIG. 17, air travels from the airbag 402 in the direction indicated by arrow 426. The vent valve 414c includes a vent plate 430 that is hingedly connected to at least a portion of the vent passage 408. The vent plate 430 is configured to fully seal the vent passage 408 when in the closed position (shown in solid lines) such that air cannot flow through the vent passage 408 when the vent plate 430 is in the fully closed position. An actuator 432 is attached to the vent plate 430. The actuator 432 is configured for moving the vent plate 430 to any desired position, between and including the closed position (shown in solid lines) and fully open position (shown in broken lines) as directed by a control system such as control system 126 or controller 354 as described above.

In the embodiment shown in FIG. 17, the vent passage 408 includes a shoulder 434. The shoulder 434 helps provide for a better seal between the vent passage 408 and the vent plate 430. The shoulder 434 can also act as a stop, preventing the vent plate 430 from hyperextending beyond the fully closed position towards the airbag 402, for example under the force of incoming water as might otherwise occur if the airbag 402 were to deploy during a water landing or crash. In alternative embodiments, the shoulder 434 can extend up into the vent passage 408 rather than extending outwardly from the vent passage 408 as shown in FIG. 17.

Referring next to FIG. 18, the vent valve 414d includes many of the same elements as vent valve 414c, and therefore retains many of the same element numbers. The main difference between vent valve 414c and vent valve 414d is that vent valve 414d includes a controllable locking system 440. The locking system 440 includes an actuator 442 or the like that can be controlled to move between a retracted position shown in solid lines and an extended position shown in broken lines. When the actuator 442 is in the retracted position, the vent plate 430 can be moved by actuator 432 from the closed position to any desired partially or fully opened position. When the actuator 442 is in the extended position, the vent plate 430 is locked into the fully closed position.

While this disclosure has referenced at least one illustrative embodiment, this description is not intended to be construed in a limiting sense. Various modifications and combinations of the illustrative embodiments, as well as other embodiments, will be apparent to persons skilled in the art upon reference to the description.

The invention claimed is:

1. A crash attenuation system for an aircraft, the system comprising:
   an airbag assembly carried by the aircraft and inflatable generally adjacent an exterior of the aircraft, the airbag assembly comprising:
      first and second inflatable airbags; and
      a vent system, the vent system comprising first and second vent passages supported by the aircraft, the first and second vent passages each having a respective one of first and second continuously adjustable vent areas through which gas can escape from within the first airbag;
   a gas source system in fluid communication with an interior of at least one of the first and second airbags for inflating at least one of the first and second airbags with gas provided by a gas source;
   a sensor system for detecting selected crash conditions; and
   a control system for receiving data from the sensor system, the control system being configured to activate and adjust the first vent system and the second vent system at least prior to impact, based upon flight conditions, the first vent system and the second vent system being independently controlled of one another based on the detected crash conditions;
   wherein the first vent passage extends between a first opening in the first vent passage and a second opening in the first vent passage; and
   wherein the first opening is in fluid communication with the interior of the first airbag, and the second opening is positioned beyond an outermost extent of the first airbag when the first airbag is inflated.

2. The crash attenuation system according to claim 1, wherein the first vent system comprises an active vent valve for controlling at least a portion of the first adjustable vent area.

3. The crash attenuation system according to claim 2, wherein the active vent valve includes a vent plate that is continuously adjustable between a fully closed position and a fully open position.

4. The crash attenuation system according to claim 3, wherein the vent plate is hingedly connected to the vent passage.

5. The crash attenuation system according to claim 3, wherein the first vent passage includes a shoulder, and wherein the vent plate is in contact with the shoulder when the vent plate is in the fully closed position.

6. The crash attenuation system according to claim 5, further comprising a locking system for locking the vent plate in the fully closed position.

7. The crash attenuation system according to claim 1, wherein the first vent system comprises a pop-off pressure release mechanism.

8. The crash attenuation system according to claim 1, wherein the control system determines a first open vent area for the first adjustable vent area based on one or more of the detected crash conditions and wherein the control system determines a second open vent area for the second adjustable vent area based on one or more of the detected crash conditions.

9. The crash attenuation system according to claim 1, wherein at least one of the first and second vent passages extends below the aircraft.

10. The crash attenuation system according to claim 1, wherein at least one of the first and second vent passages extends through at least a portion of the aircraft.

11. A crash attenuation system for an aircraft, the system comprising:
    an airbag assembly carried by the aircraft and inflatable generally adjacent an exterior of the aircraft, the airbag assembly comprising an airbag and a vent system,
    wherein the vent system comprises a vent passage supported by the aircraft, the vent passage having a continuously adjustable vent area through which gas can escape from within the first airbag;
    a gas source system in fluid communication with an interior of the airbag;
    a sensor system for detecting selected crash conditions; and
    a control system for controlling rate at which gas can escape from within the airbag through the vent passage based on the detected crash conditions, the control system activating and adjusting the vent system in communication with the airbags at least prior to impact;
    wherein the vent passage extends between a first opening in the vent passage and a second opening in the vent passage; and
    wherein the first opening is in fluid communication with the interior of the airbag, and the second opening is positioned beyond an outermost extent of the airbag when the airbag is inflated.

12. The crash attenuation system according to claim 11, wherein the vent system comprises an active vent valve for controlling at least a portion of the adjustable vent area.

13. The crash attenuation system according to claim 12, wherein the active vent valve includes a vent plate that is continuously adjustable between a fully closed position and a fully open position.

14. The crash attenuation system according to claim 13, wherein the vent plate is hingedly connected to the vent passage.

15. The crash attenuation system according to claim 13, wherein the vent passage includes a shoulder, and wherein the vent plate is in contact with the shoulder when the vent plate is in the fully closed position.

16. The crash attenuation system according to claim 15, further comprising a locking system for locking the vent plate in the fully closed position.

17. The crash attenuation system according to claim 11, wherein the vent system comprises a pop-off pressure release mechanism.

18. The crash attenuation system according to claim 17, wherein the control system determines an open vent area for the adjustable vent area based on one or more of the detected crash conditions.

19. The crash attenuation system according to claim 11, wherein at least one of the first and second vent passages extends below the aircraft.

20. The crash attenuation system according to claim 11, wherein at least one of the first and second vent passages extends through at least a portion of the aircraft.

* * * * *